July 14, 1936.   J. G. BLUNT   2,047,666
RAILWAY VEHICLE AND LATERAL MOTION RESISTANCE DEVICE THEREFOR
Filed Aug. 9, 1935   4 Sheets-Sheet 1
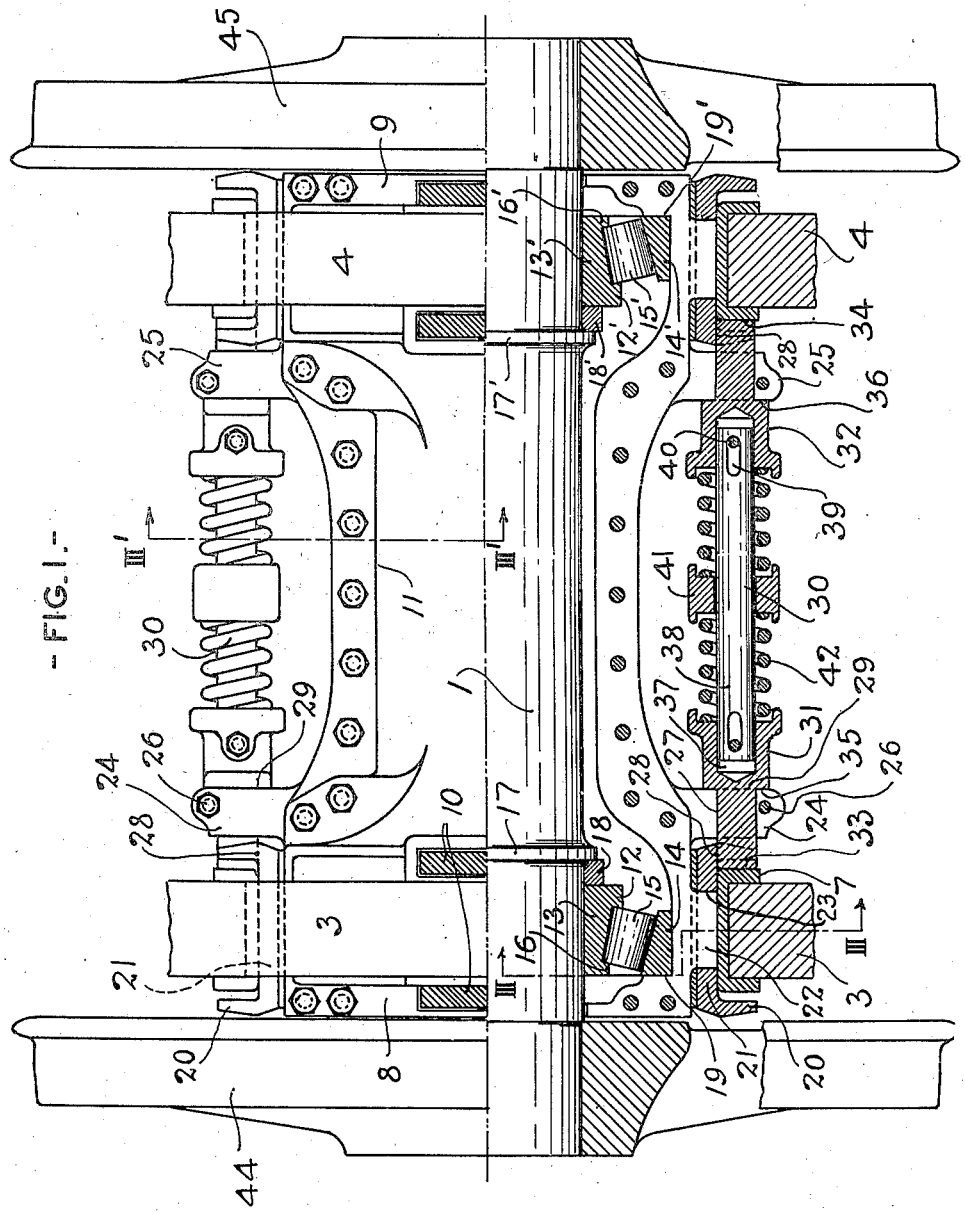
INVENTOR
James G. Blunt
BY
ATTORNEY July 14, 1936.  J. G. BLUNT  2,047,666
RAILWAY VEHICLE AND LATERAL MOTION RESISTANCE DEVICE THEREFOR
Filed Aug. 9, 1935  4 Sheets-Sheet 2
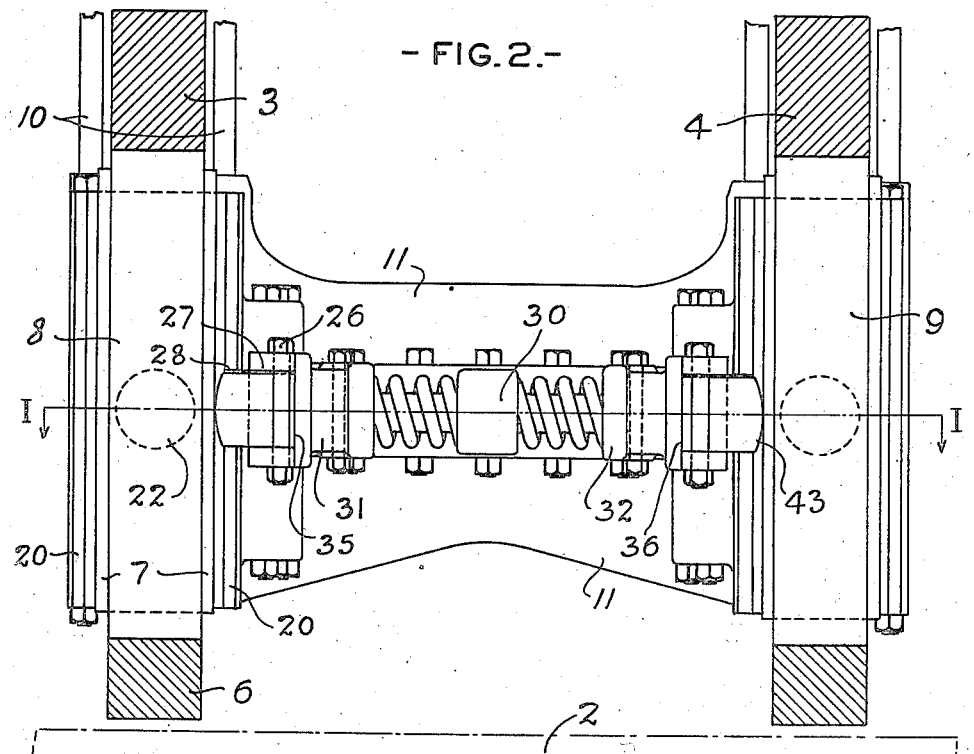
- FIG. 2. -
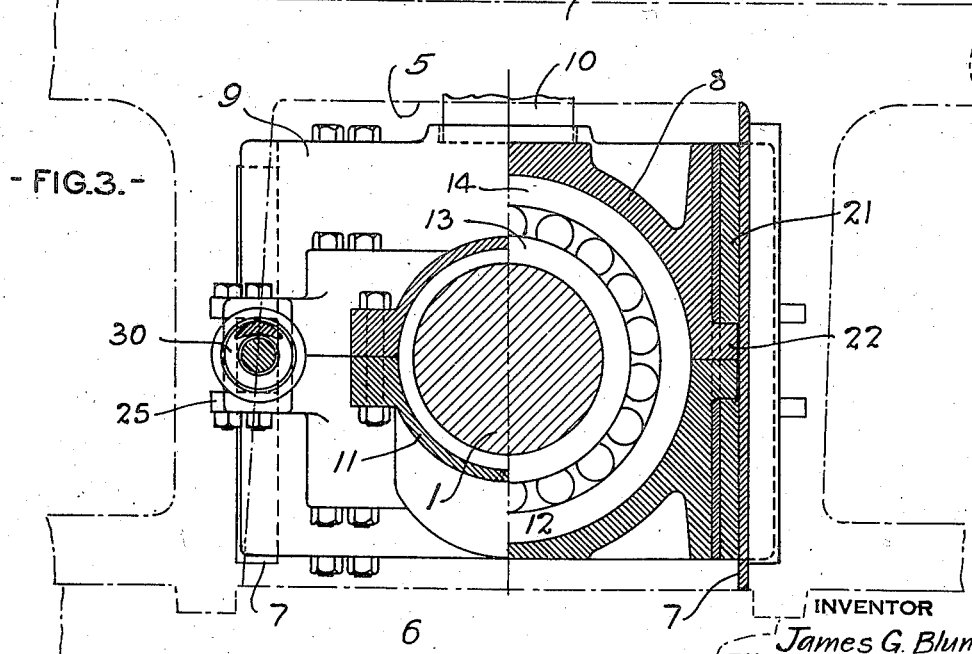
- FIG. 3. -
INVENTOR
James G. Blunt
BY S.C. Yeaton
ATTORNEY

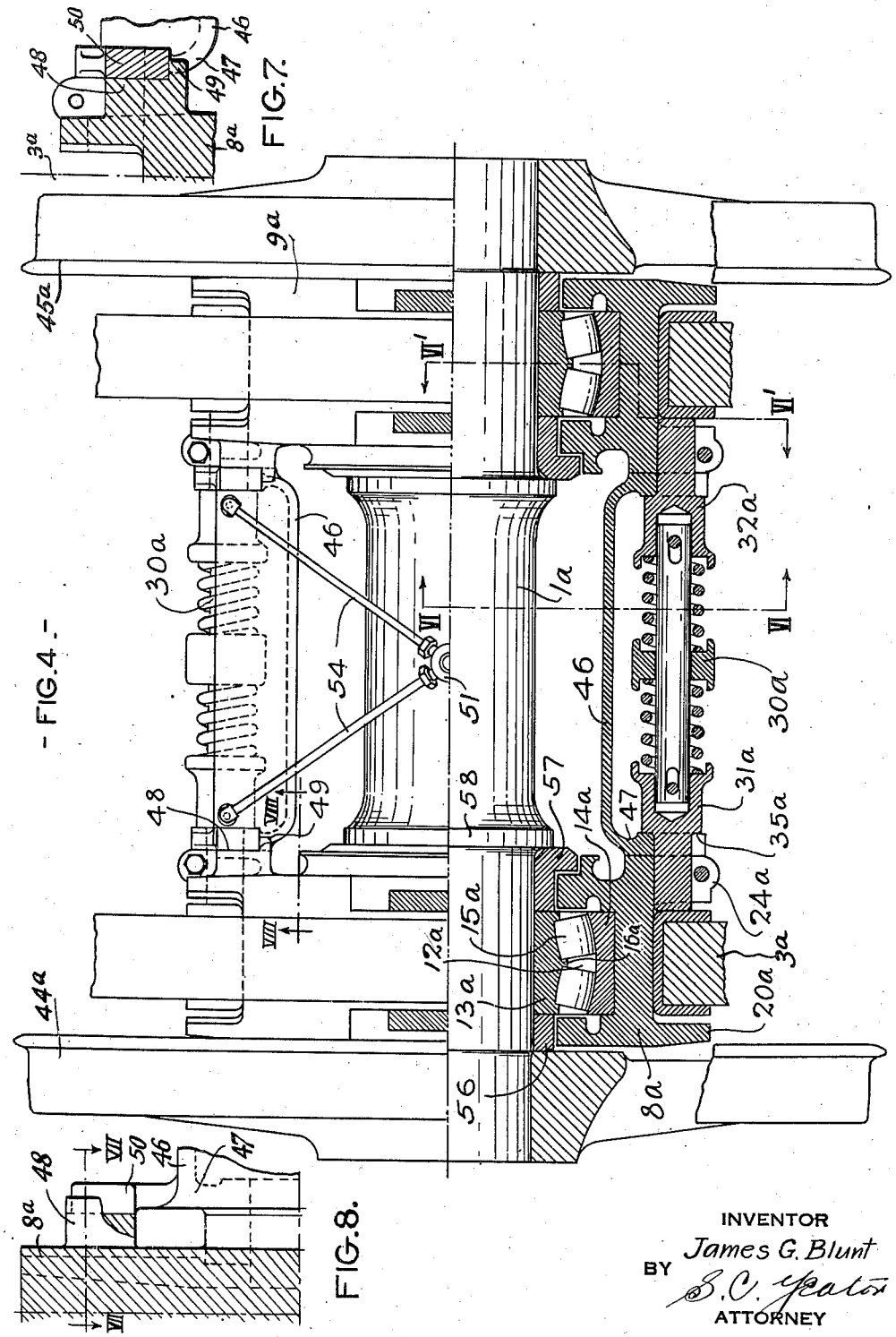

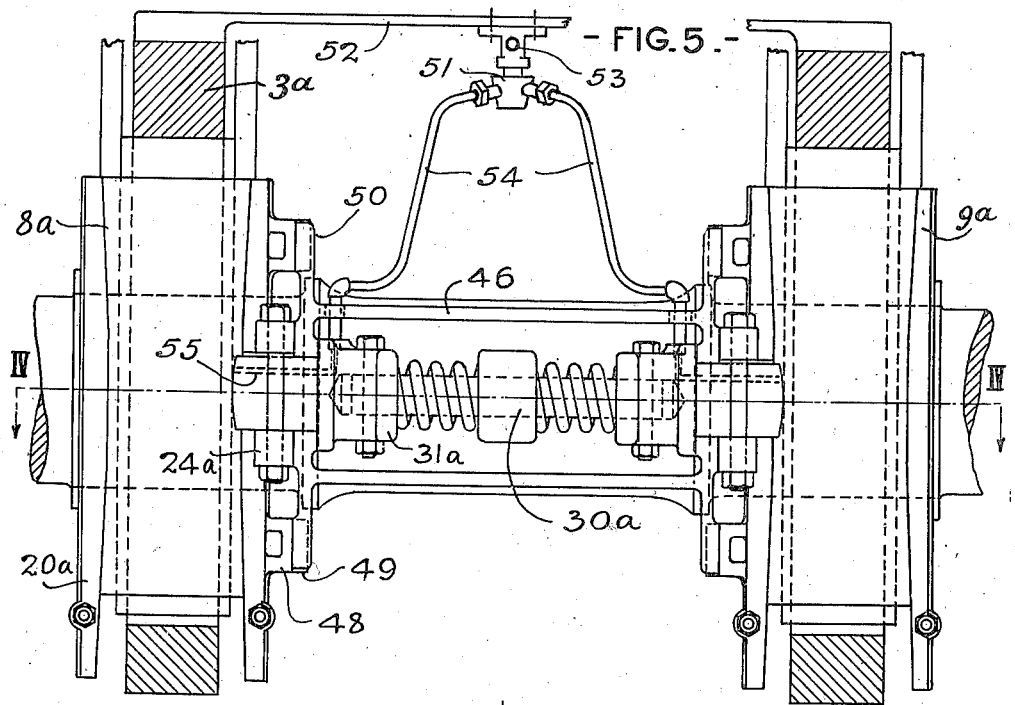
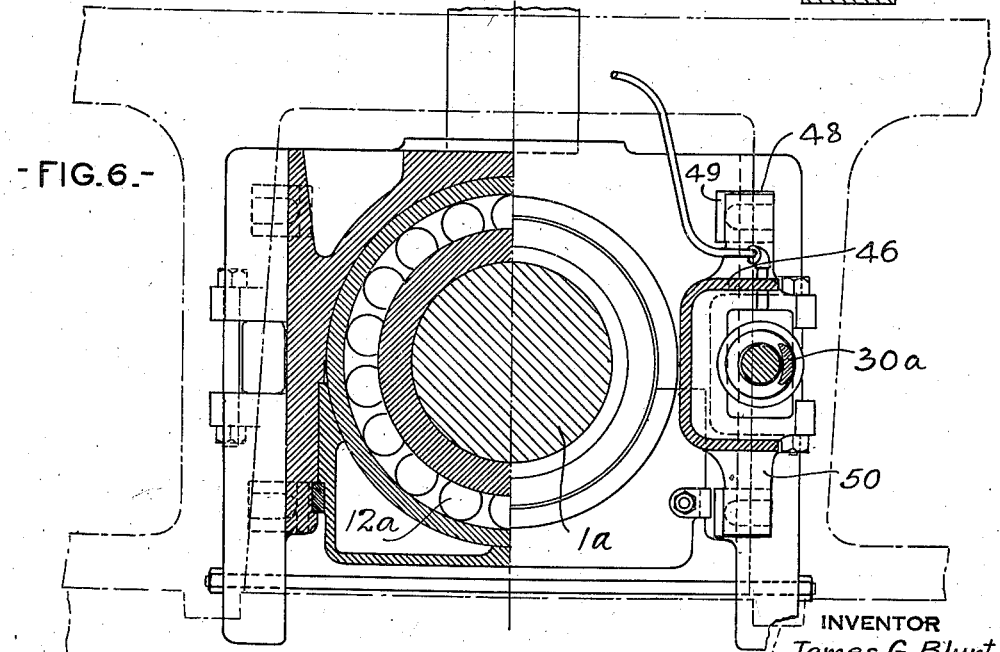

Patented July 14, 1936

2,047,666

UNITED STATES PATENT OFFICE 2,047,666

RAILWAY VEHICLE AND LATERAL MOTION RESISTANCE DEVICE THEREFOR

James G. Blunt, Schenectady, N. Y., assignor to American Locomotive Company, New York, N. Y., a corporation of New York Application August 9, 1935, Serial No. 35,441

12 Claims. (Cl. 105—80)

This invention relates to improvements in railway vehicles and lateral motion resistance devices therefor, the resistance devices being in some respects similar to the resistance device shown in Patent No. 1,946,893, granted to me February 13, 1934.

An object of the invention is to provide a resistance or cushioning device of the type aforementioned in combination with an axle and its associated parts for a railway vehicle, wherein the axle is permitted a limited lateral movement in opposite directions from normal position, relative to the frame of the vehicle and the axle journal housings are constrained for lateral movements only with the axle in said opposite directions.

A further object of the invention is to provide a construction having the above mentioned characteristics wherein frictionless bearings for transmitting the load of the vehicle from the vehicle frame to the axle are interposed between the axle and housings and constrained for lateral movements, only with the axle and housings.

A further object of the invention is to provide constructions as aforementioned wherein the resistance or cushioning device comprises lateral motion resistance means and at each end an end portion disposed at its outer end opposite its adjacent side frame member of the vehicle frame, and a part disposed inward from its outer end opposite an abutment of the adjacent housing whereby, when one of said abutments is moved in a direction toward the other abutment by force, as for instance a shock emanating from the adjacent wheel flange when entering upon the outer track of a curved portion of track, the adjacent end portion of the resistance or cushioning device will be moved, by its adjacent abutment, correspondingly against the resistance of the lateral motion resistance means, and movement of the opposite end portion will be stopped by its adjacent side frame member thereby effecting a cushioning of such shock.

A further object of the invention is to provide a lateral motion resistance or cushioning device of the aforementioned characteristics.

Further objects of and advantages achieved by this invention will be apparent from the following detailed description of approved embodiments of the invention which are illustrated in the accompanying drawings.

In the accompanying drawings: Figure 1 is, at the upper half, a plan, the spring saddles being shown in section, and at the lower half, a section on the line I—I of Fig. 2, certain parts being shown fragmentally in plan, of a railway vehicle axle and the associated parts, the side frame members being shown fragmentally, exemplifying one form of the present invention; Fig. 2 is a front elevation, the side frame members being shown in section and the spring saddles being shown fragmentally, of the construction shown in Fig. 1; Fig. 3 is, at the right, a section on the irregular line III—III, and at the left, a section on the line III'—III' of Fig. 1, of the construction there shown, the spring saddle being shown fragmentally and the side frame member being shown in dot and dash lines; Fig. 4 is a view similar to the view of Fig. 1, showing an exemplification of another form of the invention, the lower half being a section taken on the line IV—IV of Fig. 5; Fig. 5 is a view of the construction shown in Fig. 4, similar to the view of Fig. 2; Fig. 6 is, at the right, a section on the line VI—VI, and at the left, a section on the irregular line VI'—VI' of Fig. 4, of the construction there shown, the spring saddle being shown fragmentally and the side frame member being shown in dot and dash lines; Fig. 7 is an enlarged section on the line VII—VII of Fig. 8; and Fig. 8 is a section on the line VIII—VIII of Fig. 4; Figs. 7 and 8 being fragmental views showing a detail of construction.

Referring now to Figs. 1 to 3, the construction here shown is directed more particularly to a driving axle 1 of a locomotive, although the form of the invention here illustrated is not so limited but may be employed with any axle of a railway vehicle and its associated parts where found appropriate. The frame 2 of the vehicle is illustrated only insofar as is necessary for a clear understanding of the invention. It comprises side frame members 3 and 4 disposed one at each side of the locomotive provided with pedestal jaws 5, binders 6 and shoes 7. One of the shoes, as the shoe at the left, Fig. 3, serves as a wedge which will be understood is provided with the usual adjusting screw (not shown). Journal housings 8 and 9 are provided, each for a portion of the axle 1 at each side of the locomotive, spring saddles 10 being supported on the top thereof. A housing 11 rigidly connects the two journal housings 8 and 9. This rigidity of connection constitutes one of the differences in construction between this embodiment of the invention and that exemplified in Figs. 4 to 6, as will later more fully appear.

While, broadly viewed, the lateral motion resistance or cushioning devices, their associated parts and their manner of functioning, later to be described, may be employed with axle constructions of the friction type, they are however more advantageously employed with axle constructions of the frictionless type, and are so employed in both the constructions exemplified in Figs. 1 to 3 and in Figs. 4 to 6, although the invention is not so limited.

In the construction of Figs. 1 to 3, now being particularly described, a frictionless bearing 12 is disposed between the journal housing 8 and its adjacent axle portion. This bearing is in the main similar to the well-known type of Timken roller bearing shown for instance in the United States patent to Buckwalter, No. 1,860,702, May 31, 1932, which patent also shows a form of housing similar in principle to the housing 11, and for a fuller understanding of these features reference may be had to this patent.

The frictionless bearing 12 in the present instance comprises a ring-shaped inner race 13 snugly encircling the adjacent portion of the axle 1, an outer race 14 snugly housed in the adjacent journal housing and a series of conical rollers 15 arranged in a circle within the usual cage (not shown) between the races. The rollers of the series tilt in outwardly converging directions and the respective roller engaging surfaces of the races correspondingly tilt to provide the required rolling contact with the rollers. One of the races, the race 13 in the present instance, is provided with shoulders 16, one at each end of the adjacent series of rollers, thereby confining the rollers of the series against endwise movement relative to the races. A collar 17 is formed on the axle but spaced to a small extent from the race 13, and a filler ring 18 is disposed on the axle in this space.

A bearing 12' similar to the bearing 12, the parts thereof bearing reference numerals similar to the corresponding parts of the bearing 12 but with accents added, is disposed between the journal housing 9 and its adjacent axle portion, and a collar 17' and a filler ring 18', similar to the corresponding collar 17 and filler ring 18, are provided. The race 14 is seated against a shoulder 19 provided in the housing 8 and the race 14' is seated against a shoulder 19' provided in the housing 9.

Due to the construction of the parts as thus described, the housing 8, its adjacent bearing 12 and adjacent portion of the axle 1 provide an assemblage and the corresponding parts at the opposite end of the axle provide a similar assemblage, each of which assemblages moves bodily, and furthermore they move together, due to the housing 11 which rigidly connects the housings 8 and 9, when the axle 1 is moved laterally by a force, such as is produced, when the wheels of the axle are entering a curve, by the flange of the outer wheel striking the flange of the outer rail.

To permit these lateral movements bodily of the assemblages the respective journal housings 8 and 9 are provided for the required lateral movement in opposite directions from normal position relative to their adjacent side frame members 3 and 4 respectively. This provision for relative lateral movement between the assemblages and their respective side frame members forms an important part of the present invention, for such movement is required to effect the operations of the lateral motion resistance device of the present invention in order to prevent or minimize the shocks that would otherwise be transmitted from the wheel flanges to the frame of the vehicle which would finally reach the superstructure through the connecting parts. This provision for relative lateral movement between the assemblages and their respective side frame members is not only present in the construction of Figs. 1 to 3 but is equally present in the construction of Figs. 4 to 6, as will later more fully appear.

This relative movement is confined to practical limits and to this end and for further securing each of the journal housings suitably within their respective side frame members, each housing is provided with flanges 20 overlapping and spaced from the adjacent portions of their respective side frame members 3 and 4, and conveniently termed "frame flanges". More strictly speaking these flanges are spaced from the shoes 7, but for convenience these shoes will be hereafter throughout the specifications and in the claims considered as constituting parts of their respective side frame members. The frame flanges 20 in the present embodiment are formed integral with the flange members 21 which are separate from their respective housings 8 and 9 but pivotally connected thereto by trunnions 22 projecting from the end faces of the housings at the horizontal plane of the axle axis into orifices 23 provided in the members 21. This permits the journal housings to tilt with the axle relative to the frame without disturbing the proper position of the flanges 20 relative to their respective side frame members, while at the same time insuring vertical movement of the flanges 20 with their respective housings.

Each of the housings is provided with an abutment at each side of the axle in the horizontal plane of the axis of the axle and opposite an adjacent flange 20 disposed at the inner side of its adjacent side frame member. In the present instance the abutments are formed at the extreme ends of the housing 11 and comprise bifurcated lugs 24, which may be considered, for convenience, as forming parts of the housing 8, and similar bifurcated lugs 25 which likewise may be considered as forming parts of the housing 9. Each bifurcation is closed at its outer end by a bolt 26, the bifurcation and bolt thus providing a passageway 27 through the lug. The flange 20 adjacent each lug is slotted to form a passageway 28 in line with the passageway 27 in its adjacent lug, thereby providing a clear way from the inner face 29 of the lug to the adjacent side frame member.

The lateral motion resistance device of the present invention is in various respects similar in construction to the device shown in my Patent No. 1,946,893, and reference may accordingly be had thereto for a more detailed description thereof. While such device is the preferred construction, it will be understood that the invention is not limited to any particular type of device except insofar as it should comprise the characteristics of the device of the present invention which differ from the devices of the prior art. For instance where, in the present instance, two helical springs are employed, a single helical spring may be substituted or instead thereof any appropriate disc or leaf spring may be used.

Referring more particularly to the construction of the device of the present invention, two devices are employed, one at each side of the axle in the horizontal plane of the axis thereof. As the two devices are similar in all respects and similarly positioned, a description of one will suffice.

The device, indicated generally by the reference numeral 30, comprises end portions 31 and 32 extending respectively through their adjacent clear ways provided by the adjacent passageways 27 and 28 and having their respective outer ends 33 and 34 disposed opposite their adjacent respective side frame members 3 and 4.

The end portions 31 and 32 inward of their respective outer ends are provided with parts opposite their adjacent lugs 24 and 25, in the present instance comprising respectively the shoulders 35 and 36. Each of the end portions 31 and 32 is provided with a socket 37 at its inner end and a spacing bar 38 is housed at its opposite ends in these sockets. A slot 39 is formed through each end of the bar and a bolt 40 is disposed in each slot with its ends secured in its respective end portion. This provides for limited relative lateral movements of the end portions and when the bolts 40 abut the outer ends of their respective slots the end portions are then at their extreme outward positions providing thereby a maximum length for the device between its outer end portions and a maximum distance between the respective shoulders.

A collar 41 is loosely mounted on the bar 38 and a helical spring 42 is mounted on the bar at each side of the collar, having its inner end bearing against the collar and its outer end bearing against the inner face of its adjacent end portion. The springs are preferably under compression, thereby normally holding the end portions in their outermost positions, the maximum length of the device being preferably such that the device fits freely between the side frame members and the portion between the shoulders fits freely between the lugs, with little or no play.

It will be noted that the frictionless bearings as thus described are so constructed that if it were not for the housing 11 (and if no other means were substituted) the journal housings 8 and 9 and their respective adjacent outer races 14 and 14' would be free to move outward relative to the axle and the respective inner races 13 and 13'. With however the employment of the housing 11 as rigidly connected to the respective journal housings, no relative lateral movement of the parts forming the assemblages of axle portions, housings and frictionless bearings is permitted. The respective assemblages thus move laterally bodily. This movement bodily is essential in constructions of the frictionless types of the present invention. The two assemblages are also forced to move together by the housing 11.

The outer ends of the end portions are preferably rounded in vertical planes by arcs 43 struck from the center of the device to provide suitable bearing surfaces when the axle moves vertically or tilts relative to the side frame members. And as these rounded surfaces are in the horizontal plane of the axle axis tilting of the axle may take place when the resistance means are resisting a wheel flange thrust without added and unbalanced resistance occurring. The bolts 26 closing the bifurcations of the lugs 24 provide a ready means for retaining the devices in place, and all that is necessary to remove a device from the vehicle when required and to assemble another device with the vehicle is to remove these bolts 26. The railway vehicle to which the present invention is adapted is of the inside journal type and accordingly the axle 1 is provided at its opposite ends at the outer sides of the side frame members with wheels 44 and 45, these in the present instance being shown as locomotive drive wheels.

The operation of this embodiment of the invention is as follows:

When the axle moves vertically under service conditions the entire journal assemblages, together with the housing 11 and the devices, move therewith bodily as a unit. And when the axle tilts, as when one wheel is passing over a higher section of track then the opposite wheel, the aforesaid parts tilt with it as a unit, with the exception of the flange members 21, for, while these move vertically and laterally with the axle, they do not tilt therewith due to the pivotal connections between the members and their respective journal bearing housings. During these vertical and tilting movements there are corresponding movements of the outer ends of the end portions relative to the side frame members and the curvature given these ends, as aforementioned, permits suitable tilting to be effected, although under normal conditions there is preferably little or no pressure between these ends and their respective side frame members due to the construction of the devices, as aforedescribed.

When a shock is experienced producing or tending to produce a lateral movement of the axle relative to the side frame members, which movement is limited by the amount of space between the flanges 20 and their adjacent side frame members, the devices function to cushion the shock in the following manner:

Consider a shock due to the flange of the wheel 45 striking the rail flange of an outer rail when the wheel is entering upon a section of curved track. This shock would tend to move the race 13' with the axle toward the opposite frame member 3 away from the race 14' due to the direction of angularity of the bearing surface of the race 14' or, if the race 13' were loosely fitted to the axle, the axle could slide through the race 13', and the frictionless bearing 12' thereby remain stationary when such a shock is transmitted to the axle. These possible relative movements however do not occur due to the functioning of the housing 11, as will presently appear. They are here mentioned however because in these respects the frictionless bearing of the present construction (Timken bearing) varies materially from the frictionless bearing of the construction shown in Figs. 4 to 6, the latter construction for this reason functioning quite differently from the present construction, as will later more fully appear.

The shock or blow coming from the wheel 45 is imparted to the axle 1 and is carried therealong to the collar 17. From the collar 17 it passes to the abutting ring 18 and from there to the race 13. From the race 13, due to the direction of angularity of its bearing surface and the bearing surface of the race 14, the shock is transmitted through the series of rollers 15 to the race 14, and from there to the housing 8, through the shoulder 19 formed thereon. This assemblage thus moves bodily with the axle 1, and the housing 11 being rigidly secured to the housing 8 moves therewith as does also the housing 9 which is likewise rigidly connected to the housing 11. The shoulder 19' formed on the housing 9 produces a similar movement of the race 14' due to its engagement therewith. The race 14', due to the direction of angularity of its bearing surface and that of the race 13', effects a similar movement of the series of roller bearings 15' and race 13'. Thus both assemblages move simultaneously bodily in the same direction under such a shock or blow.

During this movement of the axle and its aforementioned associated parts the abutment or lug 25 of the housing 9 bears against the oppositely disposed part or shoulder 36 of the end portion 32 carrying this end portion with it, the outer end 34 of which being accordingly incidently moved away from its adjacent side frame member 4. This movement of the end portion 32 is against the resistance produced by the lateral motion resistance device. The springs 42 are accordingly compressed and the outer end 33 of the end portion 31 is simultaneously brought into spring-pressed engagement with its adjacent side frame member 3, thereby stopping any movement of the end portion 31 in the direction of movement of the axle, thus producing the desired cushioning of this shock or blow to minimize its undesirable effect upon the vehicle, the abutment or lug 24 being simultaneously incidently moved away from the adjacent part or shoulder 35 of the end portion 31.

It will be understood that both of the devices operate simultaneously in the same manner, and also that the various parts function in a corresponding manner to effect a similar cushioning when the blow or shock emanates from the wheel 44. The parts adjacent the side frame member 3, during such shock or blow, function similarly to the parts adjacent the side frame member 4, and vice versa, as just described when the blow or shock emanated from the wheel 45, and a more detailed description is not deemed necessary.

The lateral motion devices, as before remarked, are more or less similar to the device of my Patent 1,946,893, but whereas the device of said patent is chiefly designed for constructions where the journal housing has lateral movement from normal position in an inward direction only, the present device, as already remarked, is especially designed for constructions where the journal housing is provided for lateral movement from normal position in both outward and inward directions. Accordingly in the construction of the patent the outer ends of the end portions of the device are disposed opposite the inner walls of their adjacent journal housings, the journal housing at the end of the device where the shock emanates operating, when moved by the shock, to move the adjacent end portion of the device against the resistance of the resistance means of the device, while the opposite end portion by its engagement with its adjacent journal housing, which housing normally bears against its adjacent side frame member, is simultaneously stopped against movement and a cushioning effect thus produced. In the device of the present construction the end portion is stopped against movement by its outer end contacting with its adjacent side frame member and the adjacent journal housing is left free to move laterally with the axle.

The lateral resistance device of the patent serves as a centering device to return the laterally displaced parts to their normal positions after the shock or blow has been spent. The device of the present invention likewise operates to return the parts to their normal central positions.

The centering operation is accomplished in the following manner:—Assume that the parts have been laterally displaced as aforedescribed by a shock or blow emanating from the wheel 45 and that the effect of the shock or blow has been spent, leaving the devices free to function as centering devices. First it should be noted that in arriving at these positions the assemblage involving the journal housing 9 has been in effect pulled along by the opposite assemblage through the functioning of the rigidly connected housing 11. In the centering of the parts the operation is reversed. The end 33 of the end portion 31, due to the compression of the resistance means, maintains its contact with its adjacent side frame member 3, and the part or shoulder 36 which is in pressed engagement with the abutment or lug 25 moves this abutment or lug and the housing 9 which it forms a part of, toward its side frame member 4 to normal position due to the recoiling of the compressed springs forming the resistance means. The housing 11 and journal housing 8 are pulled along, so to speak, with the housing 9, to normal positions. The shoulder 19 forces the race 14, and the race 14, due to the direction of angularity of its bearing surface and that of the race 13, forces the race 13 and series of rollers 15 to normal positions. The race 13 bears against the ring 18 and the ring 18 bears against the collar 17, thereby forcing the axle 1 to normal position. The axle 1 and the several parts of the frictionless bearing 12 are thereby moved to normal positions by pushing rather than pulling forces. The collar 17' bearing against the ring 18', and the ring 18' bearing against the race 13', effect a simultaneous pushing of the race 13' to normal position, and the race 13', due to the direction of angularity of its bearing surface and that of the race 14', effects, by pushing actions, a movement of the series of rollers 15' and race 14' simultaneously to their respective normal positions.

It will be understood that both of the devices operate simultaneously in the same manner, and also that the various parts function in a corresponding manner to effect the restoring of the parts to their normal positions when the blow or shock emanates from the wheel 44. The parts adjacent the side frame member 3, during such centering operation, function similarly to the parts adjacent the side frame member 4, and vice versa, as just described when the blow or shock emanated from the wheel 45, and a more detailed description is not deemed necessary.

Coming now to the exemplification of the invention shown in Figs. 4 to 6:—In the main this embodiment is quite similar to the embodiment shown in Figs. 1 to 3 except that a different style of frictionless bearing is employed, the housing 11 eliminated, and other means, which function in part similar to the housing 11, substituted therefor, all of which will presently more fully appear.

Various of the parts similar to those of Figs. 1 to 3 are indicated with similar reference characters with the letter *a* affixed. The type of frictionless bearing here employed is known as the SKF roller bearing and is shown in the patent to Tawresey, 1,787,459, January 6, 1931, to which patent reference may be had for a fuller understanding thereof. Lateral motion resistance and centering devices are employed similar to those shown in Figs. 1 to 3 and similarly located.

The frictionless bearing 12a of the housing 8a comprises an inner race 13a, an outer race 14a and two series of rollers 15a connected by a cage (not shown) in the usual manner. A spherical bearing surface for the two series of rollers is provided on one of the races, in the present instance the race 14a. This spherical surface positions the rollers of the outer series to converge outwardly, and positions the rollers of the inner series to converge inwardly, the race 13a being provided with bearing surfaces for the rollers of each of the series suitably inclined to engage their respective rollers. At each end and at the center of the race 13a are shoulders 16a thereby confining the rollers of the series against endwise movement relative to the race 13a but permitting angular tilting movement thereof relative to the race 14a.

It will be understood that there is the usual slight amount of play between the various parts which in cooperation with the spherical bearing surface permits, when occasion arises, a slight free angular or tilting relative movement between the axle 1a with its race 13a and the housing 8a with its race 14a. If provision were not present for such slight free relative tilting movement an undesirable tendency to twisting of various of the parts with attendant undue pressure thereof destroying to some extent the free frictionless functioning of the bearing, would result.

The housing 11 of the previous construction, as before remarked, is not present in this construction and other means are provided which function in part similar to the housing 11. Such means in the present instance comprises a spreader 46, which has the general shape of a channel, open at the front, in which the lateral motion resistance device is housed. The back wall of the spreader is vertical and the top and bottom walls are horizontal. The spreader is provided, at its end adjacent the abutment or lug 24a, and oppositely disposed to the inner face thereof, with an end wall 47 connected to the back, top and bottom walls of the spreader, having a passageway therethrough open at the front.

In this construction the frame flanges 20a are formed integrally with their respective housings instead of being separate therefrom and pivotally connected thereto as in the construction of Figs. 1 to 3, and the abutments or lugs 24a are formed contiguous with the inner frame flanges. The passageway of the end wall 47 is in line with the passageways of the abutment or lug 24a and the inner frame flange 20a, and the end portion 31a passes through these passageways with the part or shoulder 35a disposed opposite the inner face of the end wall 47. The spreader 46 is thus mounted upon the lateral motion resistance device 30a and is prevented from outward movement by the engagement of the end portion 31a of the device with the rear face of the passageway formed in the end wall 47.

Lugs 48, provided with outwardly facing shoulders 49 are formed on the inner face of the journal housing 8a, one above and one below the end wall 47, preferably positioned near the top and bottom respectively of the journal housing. Extensions 50 are formed on the end wall 47, one protruding upwardly with its upper portion disposed in the angle formed by the shoulder of the upper lug 48 and one protruding downwardly with its lower portion disposed in the angle formed by the shoulder of the lower lug 48.

The rear faces of these upper and lower portions of the extensions are disposed opposite the front faces of the shoulders 49, thereby holding the spreader from moving toward the axle 1a. The outer side faces of these upper and lower portions of the extensions are disposed opposite the inner faces of the lugs 48, thereby preventing either of the journal housings from moving toward the other from their normal positions to lessen the distance therebetween. The spreader is thus held by its engagement with the shouldered lugs 48, the lateral resistance device 30a and the abutments or lugs 24a, from displacement in any direction.

The parts at the opposite side of the vehicle corresponding to the parts just described are similar, that is to say the vehicle, in this respect, is symmetrical on each side of its longitudinal center line and the construction of these parts is duplicated by a second spreader and associated parts on the opposite side of the axle 1a, and a further detailed description of these parts is therefore deemed not necessary.

The wear surfaces between the outer ends of the end portions 31a and 32a and their respective adjacent side frame members are preferably lubricated in the following manner:—A pipe fitting 51 is secured to a cross member 52 of the frame and is provided with an inlet orifice 53 which is connected to any suitable lubricant source of supply (not shown). The fitting is provided with four outlet branch pipes 54 which extend at their lower ends through holes in the upper walls of the respective spreaders and terminate in holes formed in the respective end portions of the lateral motion resistance devices. The branch pipes 54 are sufficiently flexible and the holes in the spreaders are made sufficiently large to provide for the limited relative lateral movements allowed the end portions of the lateral motion resistance devices. Each of the end portions of the devices is provided with a passageway 55 extending from and communicating with the respective pipe 54 to the outer end of the respective end portions. Thus a lubricant may be conveyed from the lubricant source of supply to the said wear surfaces. While this lubricating means is shown only in connection with the construction of Figs. 4 to 6, it is obvious that in a suitable manner it may, when desired, be added to the construction of Figs. 1 to 3.

The operation of the device is as follows:

It will first be noted that the spreaders 46 are not rigidly connected to the journal housings. They merely lie with their end walls opposite the adjacent abutments or lugs forming part of the housings, forming thereby, in effect flexible connections with the housings, leaving the housings free for any slight relative angular or tilting movements with the axle as has been previously mentioned. While such connections prevent the housings from moving closer together they do not prevent them from moving further apart.

This latter possible movement is prevented in the following manner:—The outer races are disposed in the housings between shoulders formed in the housings thereby preventing any lateral movement between the outer races and their adjacent housings. The inner races are disposed between rings 56 mounted on the axle with their outer ends adjacent the respective wheels and their inner ends adjacent the inner races, and rings 57 mounted on the axle with their outer ends adjacent the respective collars 58 formed on the axle and their inner ends adjacent the inner races, thereby preventing any lateral movement between the inner races and the axle. Should there be any tendency toward relative movement between a journal housing and the axle this would be prevented by the two series of rollers of the assemblage due to the direction of angularity of their race-engaging surfaces. Should the tendency of such movement be to move the housing nearer to its adjacent wheel the series of rollers most remote from the wheel would prevent such movement, and should the tendency for movement be in the opposite direction the other series of rollers would prevent this. Therefore the several parts of each assemblage will maintain their normal aligned positions at all times, bearing in mind however that the slight relative angular or tilting movements, already referred to, may take place under certain conditions of service.

When the axle tilts, as when one wheel is passing over a higher section of track than the opposite wheel, the assemblages tilt likewise therewith, the frame flanges of the journal housings being suitably flared on their inner faces from their central portions upwardly and downwardly in the usual manner to facilitate such tilting. The simultaneous tilting of the two journal housings and their respective attendant outer races is effected or assured by the spreaders 46, due to their engagements with the housings, which engagements, for attaining the best results, are, as aforedescribed, at widely spaced points of the respective journal housings. These spreaders provide for an easy tilting of the assemblages at such times and prevent any twisting action that would occur between the parts of the frictionless bearings which would lessen to a corresponding extent their desired frictionless functioning were the spreaders not employed.

Coming now to the operation of the axle and its associated parts when subjected to a blow or shock, as for instance a blow or shock emanating from the wheel 45a, the lateral motion resistance device functions similarly to that of Figs. 1 to 3 and a repetition of its detailed operation will therefore be unnecessary here. The relative movements of the other parts involving the assemblages are however different.

The axle moves laterally in the direction of the blow or shock, that is to say toward the side frame member 3a, carrying the inner race adjacent the wheel 45a with it. The corresponding outer race and the journal housing 9a are carried therewith by the inner series of rollers between these races due to the direction of angularity of the corresponding bearing surfaces of the races for this series of rollers. The opposite inner race is likewise carried by the axle and the outer race and adjacent journal housing are likewise simultaneously moved but by the outer series of rollers of this assemblage due to the direction of angularity of the corresponding bearing surfaces of the races for this series of rollers. By a comparison of the operation of the present construction with that of Figs. 1 to 3 it will be noted that there is quite a difference therebetween. During this movement of the parts the resistance means is compressed similarly to that of Figs. 1 to 3 and the effect of the shock or blow thereby cushioned. Both of the lateral motion resistance devices operate simultaneously in a similar manner.

It is believed that from the aforegoing description the operation of the parts will be obvious when the shock or blow emanates from the wheel 44a. Likewise the centering operation of the device whereby the various parts are brought to their normal positions is believed to be obvious and no further detailed descriptions of these various operations are deemed necessary.

While there have been hereinbefore described certain approved embodiments of the instant invention it will be apparent to those skilled in the art that many and various changes and modifications may be made thereto, but it will be understood that all such changes and modifications as fall fairly within the spirit of the present invention and the scope of the appended claims are contemplated as a part of this invention.

The invention claimed and desired to be secured by Letters Patent is:

1. In combination with a frame for a railway vehicle, said frame having a side frame member at each side thereof, an axle; a wheel on each end of said axle adjacent one of said side frame members at the outer side thereof; a journal bearing housing for a portion of said axle housed in each of said side frame members adapted for limited lateral movement from its normal position relative to its adjacent side frame member, and having a frame flange extending beyond an edge of its inner face overlapping, in spaced relation, the adjacent portion of the inner face of its adjacent side frame member, provided with a transverse passageway extending therethrough, said flanges being disposed at the same side of said axle; and a lateral motion resistance device between said side frame members comprising an end portion at each end thereof extending through said passageway adjacent thereto and lateral motion resistance means, one of said end portions being disposed with its outer end opposite the side frame member adjacent thereto to be engaged thereby to stop said end portion against lateral movement relative theretoward and the opposite end portion being disposed with a part thereof, spaced inwardly from its outer end, opposite the housing adjacent thereto to be engaged thereby to be moved laterally toward said stoppable end portion against the resistance of said resistance means when force is applied to move its said adjacent housing in a direction toward said stoppable end portion.

2. In combination with a frame for a railway vehicle, said frame having a side frame member at each side thereof, an axle; a wheel on each end of said axle adjacent one of said side frame members at the outer side thereof; a journal bearing housing for a portion of said axle housed in each of said side frame members adapted for limited lateral movement from its normal position relative to its adjacent side frame member, and having a frame flange extending beyond an edge of its inner face overlapping, in spaced relation, the adjacent portion of the inner face of its adjacent side frame member, provided with a transverse passageway extending therethrough, said flanges being disposed at the same side of said axle; and a lateral motion resistance device between said side frame members comprising lateral motion resistance means and an end portion at each end extending through said passageway adjacent thereto disposed with its outer end opposite the side frame member adjacent thereto to be stopped by engagement therewith, and with a part opposite the housing adjacent thereto to be engaged thereby whereby, when force is applied to laterally move either of said housings in a direction toward the opposite side frame member, a similarly directed movement of said end portion adjacent said moved housing by engagement therewith will be effected by said moved housing against the resistance of said resistance means and lateral movement of said end portion adjacent said opposite side frame member will be stopped by its engagement with its said adjacent side frame member.

3. In combination with a frame for a railway vehicle, said frame having a side frame member at each side thereof, an axle; a wheel on each end of said axle adjacent one of said side frame members at the outer side thereof; a journal bearing housing for a portion of said axle housed in each of said side frame members adapted for limited lateral movement in opposite directions from its normal position relative to its adjacent side frame member, and having a frame flange extending beyond an edge of its inner face overlapping, in spaced relation, the adjacent portion of the inner face of its adjacent side frame member, provided with a transverse passageway extending therethrough and an abutment having an inner face and a transverse passageway in alignment with said flange passageway providing a clear way from said abutment inner face to said adjacent side frame member, said flanges being disposed at the same side of said axle; and a lateral motion resistance device disposed between said side frame members comprising an end portion at each end thereof extending through the adjacent clear way, and lateral motion resistance means, one of said end portions being disposed with its outer end opposite its adjacent side frame member to be stopped thereby against lateral movement relative theretoward, and the opposite end portion being disposed with a part thereof opposite an adjacent abutment to be laterally moved thereby toward said stoppable end portion against the resistance of said resistance means when force is applied to move said adjacent abutment in a direction toward said stoppable end portion.

4. In combination with a frame for a railway vehicle, said frame having a side frame member at each side thereof, an axle; a wheel on each end of said axle adjacent one of said side frame members at the outer side thereof; a housing for a portion of said axle housed in each of said side frame members adapted for limited lateral movement in opposite directions from its normal position relative to its adjacent side frame member, and having a frame flange extending beyond an edge of its inner face overlapping, in spaced relation, the adjacent portion of the inner face of its adjacent side frame member, provided with a transverse passageway extending therethrough and an abutment having an inner face and a transverse passageway in alignment with said flange passageway providing a clear way from said abutment inner face to said adjacent side frame member, said flanges being disposed at the same side of said axle; a frictionless bearing for said axle disposed in each of said housings, each said axle portion, said frictionless bearing and said housing therefor constituting an assemblage adapted for lateral movement bodily; and a lateral motion resistance device disposed between said side frame members comprising an end portion at each end thereof extending through the adjacent clearway, and lateral motion resistance means, one of said end portions being disposed with its outer end opposite its adjacent side frame member to be stopped thereby against lateral movement relative theretoward, and the opposite end portion being disposed with a part thereof opposite an adjacent abutment to be laterally moved thereby toward said stoppable end portion against the resistance of said resistance means when force is applied to move said adjacent abutment in a direction toward said stoppable end portion.

5. In combination with a frame for a railway vehicle, said frame having a side frame member at each side thereof, an axle; a wheel on each end of said axle adjacent one of said side frame members at the outer side thereof; a housing for a portion of said axle housed in each of said side frame members adapted for limited lateral movement in opposite directions from its normal position relative to its adjacent side frame member, and having a frame flange extending beyond an edge of its inner face overlapping, in spaced relation, the adjacent portion of the inner face of its adjacent side frame member, provided with a transverse passageway extending therethrough and an abutment having an inner face and a transverse passageway in alignment with said flange passageway providing a clear way from said abutment inner face to said adjacent side frame member, said flanges being disposed at the same side of said axle; a frictionless bearing for said axle disposed in each of said housings, each said axle portion, said frictionless bearing and said housing therefor constituting an assemblage adapted for lateral movement bodily; and a lateral motion resistance device disposed between said side frame members comprising lateral motion resistance means and an end portion at each end extending through the adjacent clear way and disposed with its outer end opposite its adjacent side frame member and with a part opposite its adjacent abutment whereby, when force is applied to laterally move either of said abutments in a direction toward the opposite abutment, a similarly directed movement by said moved abutment of said end portion adjacent thereto will be effected against the resistance of said resistance means, and lateral movement of said opposite end portion will be stopped by its engagement with its said adjacent side frame member.

6. In combination with a frame for a railway vehicle, said frame having a side frame member at each side thereof, an axle; a wheel on each end of said axle adjacent one of said side frame members at the outer side thereof; a housing for a portion of said axle housed in each of said side frame members adapted for limited lateral movement in opposite directions from its normal position relative to its adjacent side frame member; a frictionless bearing for said axle disposed in each of said housings, each said axle portion, said frictionless bearing and said housing therefor constituting an assemblage adapted for lateral movement bodily; a lateral motion resistance device disposed between said side frame members comprising an end portion at each end thereof and lateral motion resistance means, one of said end portions being disposed with its outer end opposite its adjacent side frame member to be stopped thereby against lateral movement relative theretoward, and the opposite end portion being disposed with a part thereof opposite an adjacent housing to be laterally moved by said adjacent housing toward said stoppable end portion against the resistance of said resistance means when force is applied to move said adjacent housing in a direction toward said stoppable end portion; and rigid means spanning said housings and in engagement therewith at points above and below said axle, at least one of said engagements being flexible, said rigid means being adapted, when said axle tilts in a vertical plane, to effect a corresponding tilting of said housings to substantially maintain the normal vertical angle of said housings relative to said axle.

7. In combination with a frame for a railway vehicle, said frame having a side frame member at each side thereof, an axle; a wheel on each end of said axle adjacent one of said side frame members at the outer side thereof; a housing for a portion of said axle housed in each of said side frame members adapted for limited lateral movement in opposite directions from its normal position relative to its adjacent side frame member, and having a frame flange extending beyond an edge of its inner face overlapping, in spaced relation, the adjacent portion of the inner face of its adjacent side frame member, provided with a transverse passageway extending therethrough and an abutment having an inner face and a transverse passageway in alignment with said flange passageway providing a clear way from said abutment inner face to said adjacent side frame member, said flanges being disposed at the same side of said axle; a frictionless bearing for said axle disposed in each of said housings, each said axle portion, said frictionless bearing and said housing therefor constituting an assemblage adapted for lateral movement bodily in opposite directions; a lateral motion resistance device disposed between said side frame members comprising an end portion at each end thereof extending through the adjacent clearway and lateral motion resistance means, one of said end portions being disposed with its outer end opposite its adjacent side frame member to be stopped thereby against lateral movement relative thereto ward, and the opposite end portion being disposed with a part thereof opposite its adjacent abutment to be laterally moved by said adjacent abutment toward said stoppable end portion against the resistance of said resistance means when force is applied to move said adjacent abutment in a direction toward said stoppable end portion; and means between said housings in rigid connection therewith to effect, when said axle tilts in a vertical plane, a corresponding tilting of said housings to maintain said housings at right angles to said axle.

8. In combination with a frame for a railway vehicle, said frame having a side frame member at each side thereof, an axle; a wheel on each end of said axle adjacent one of said side frame members at the outer side thereof; a housing for a portion of said axle housed in each of said side frame members; a frictionless bearing for said axle disposed in each of said housings comprising an inner race adjacent said axle, an outer race adjacent said housing and frictionless elements disposed between and in engagement with the opposed surfaces of said races, one of said engaging race surfaces being spherical to permit relative angular movements between said axle and said housing, each said axle portion, said frictionless bearing and said housing therefor being adapted for restriction against any relative lateral movements therebetween and constituting an assemblage adapted for limited lateral movement bodily in opposite directions from its normal position relative to its adjacent side frame member; a lateral motion resistance device disposed between said side frame members comprising lateral motion resistance means and an end portion at each end thereof, one of said end portions being disposed with its outer end opposite an adjacent side frame member to be stopped thereby against lateral movement relative theretoward, and the opposite end portion being disposed with a part thereof opposite the assemblage adjacent thereto to be laterally moved thereby toward said stoppable end portion against the resistance of said resistance means when force is applied to move said adjacent assemblage in a direction toward said stoppable end portion; and a member disposed between and flexibly connected to at least one of said housings to space said housings and to permit said angular movements of either of said housings independently of the other.

9. In combination with a frame for a railway vehicle, said frame having a side frame member at each side thereof, an axle; a wheel on each end of said axle adjacent one of said side frame members at the outer side thereof; a housing for a portion of said axle housed in each of said side frame members; a frictionless bearing for said axle disposed in each of said housings comprising an inner race adjacent said axle, an outer race adjacent said housing and frictionless elements disposed between and in engagement with the opposed surfaces of said races, one of said engaging race surfaces being spherical to permit relative angular movements between said axle and said housing, each said axle portion, said frictionless bearing and said housing therefor being adapted for restriction against any relative lateral movements therebetween and constituting an assemblage adapted for limited lateral movement bodily in opposite directions from its normal position relative to its adjacent side frame member; two lateral motion resistance devices disposed between said side frame members, one at each side of said axle in the horizontal plane thereof, each of said devices comprising lateral motion resistance means and an end portion at each end thereof, an end portion of each of said device at the same side of said vehicle being disposed with its outer end opposite the side frame member of said side to be stopped thereby against lateral movement relative theretoward, and the other end portion of each device being disposed with a part thereof opposite the assemblage at the other side of said vehicle to be laterally moved thereby toward its said stoppable end portion against the resistance of its said resistance means when force is applied to move said last mentioned assemblage in a direction toward its said stoppable end portion; and a member disposed between and flexibly connected to at least one of said housings adjacent each of said lateral motion resistance devices to space said housings and to permit said angular movements of either of said housings independently of the other.

10. In combination with a frame for a railway vehicle, said frame having a side frame member at each side thereof, an axle; a wheel on each end of said axle adacent one of said side frame members at the outer side thereof; a housing for a portion of said axle housed in each of said side frame members; a frictionless bearing disposed between each of said housings and said axle adapted to prevent relative lateral movement between said housing adjacent thereto and said axle and to permit relative angular movements between said housing adacent thereto and said axle; a member disposed between said housings and flexibly connected to at least one of said housings to space said housings and to permit said angular movements of either of said housings independently of the other; and a lateral motion resistance device disposed lengthwise between said side frame members comprising end portions, and a lateral motion resistance means between said end portions, each of said end portions having a part disposed opposite an adjacent side frame member to be stopped thereby and having another part disposed opposite the housing adjacent thereto to be moved thereby to compress said resistance means, whereby said device will be stopped at one end portion by the side frame member adjacent said end portion and will be moved at the other end portion by the housing adjacent said other end portion when a laterally directed force is applied to said last mentioned adjacent housing.

11. In combination with a frame for a railway vehicle, said frame having a side frame member at each side thereof, an axle; a wheel on each end of said axle adjacent one of said side frame members at the outer side thereof; a housing for a portion of said axle housed in each of said side frame members; a frictionless bearing disposed between each of said housings and said axle adapted to prevent relative lateral movement between said housing adjacent thereto and said axle and to permit relative angular movements between said housing adjacent thereto and said axle; means disposed between said housings to space said housings and associated with said housings to permit said angular movements of either of said housings independently of the other; and a lateral motion resistance device disposed lengthwise between said side frame members comprising end portions, and a lateral motion resistance means between said end portions, each of said end portions having a part disposed opposite an adjacent side frame member to be stopped thereby and having another part disposed opposite the housing adjacent thereto to be moved thereby to compress said resistance means, whereby said device will be stopped at one end portion by the side frame member adjacent said end portion and will be moved at the other end portion by the housing adjacent said other end portion when a laterally directed force is applied to said last mentioned adjacent housing.

12. In combination with a frame for a railway vehicle, said frame having a side frame member at each side thereof, an axle; a wheel on each end of said axle adjacent one of said side frame members at the outer side thereof; a housing for a portion of said axle housed in each of said side frame members; a frictionless bearing disposed between each of said housings and said axle adapted to prevent relative lateral movement between said housing adjacent thereto and said axle and to permit relative angular movements between said housing adjacent thereto and said axle; and means disposed between said housings to space said housings and associated with said housings to permit said angular movements of either of said housings independently of the other.

JAMES G. BLUNT.